(12) United States Patent
Maruyama et al.

(10) Patent No.: US 7,581,523 B2
(45) Date of Patent: Sep. 1, 2009

(54) AUXILIARY ARRANGEMENT STRUCTURE IN INTERNAL COMBUSTION ENGINE

(75) Inventors: Shigeru Maruyama, Wako (JP); Takayuki Yamagata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 76 days.

(21) Appl. No.: 11/854,955

(22) Filed: Sep. 13, 2007

(65) Prior Publication Data

US 2008/0066708 A1 Mar. 20, 2008

(30) Foreign Application Priority Data

Sep. 14, 2006 (JP) .............................. 2006-249587

(51) Int. Cl.
*F02M 35/10* (2006.01)
(52) U.S. Cl. .............................. 123/184.55; 123/90.15
(58) Field of Classification Search ... 123/90.15–90.18, 123/184.55

See application file for complete search history.

(56) References Cited

U.S. PATENT DOCUMENTS 6,609,491 B2 * 8/2003 Itoh et al. ............... 123/195 A 7,401,581 B2 * 7/2008 Yamada ................... 123/90.15

FOREIGN PATENT DOCUMENTS

| JP | 04214923 A | * | 8/1992 |
| JP | 05306627 A | * | 11/1993 |
| JP | 11-44206 A | | 2/1999 |

* cited by examiner

*Primary Examiner*—Noah Kamen
(74) *Attorney, Agent, or Firm*—Westerman, Hattori, Daniels & Adrian, LLP.

(57) ABSTRACT

In an internal combustion engine, an actuator for driving a control shaft of a variable valve-operating mechanism is disposed in a space surrounded by a cylinder head having a plurality of intake ports, an intake manifold having a plurality of branch pipes connected to the intake ports, and a throttle body disposed at one end in a direction of arrangement of the branch pipes. Thus, the actuator can be disposed by effectively utilizing such an unused space surrounded by the cylinder head, the intake manifold and the throttle body, thereby reducing the entire length and the entire height of the internal combustion engine including the actuator.

5 Claims, 11 Drawing Sheets

AUXILIARY ARRANGEMENT STRUCTURE IN INTERNAL COMBUSTION ENGINE

RELATED APPLICATION DATA

The Japanese priority application No. 2006-249587 upon which the present application is based is hereby incorporated in its entirety herein by reference.

BACKGROUND OF THE INVENTION

1. Field of the Invention

The present invention relates to an auxiliary arrangement structure in an internal combustion engine, in which an auxiliary is disposed utilizing a space formed in the vicinity of a cylinder head of the internal combustion engine.

2. Description of the Related Art

There is an auxiliary arrangement structure known from Japanese Patent Application Laid-open No. 11-44206, in which an actuator for actuating a variable valve-operating mechanism for changing a valve lift amount and a valve lift timing of an engine valve of an internal combustion engine is attached to an upper surface or a side surface of a head cover covering a valve-operating chamber which houses the variable valve-operating mechanism.

The auxiliary arrangement structure described in Japanese Patent Application Laid-open No. 11-44206 has a problem that the actuator for actuating the variable valve-operating mechanism overhangs from the upper surface or the side surface of the head cover, resulting in an increase in size of the internal combustion engine including the actuator.

SUMMARY OF THE INVENTION

The present invention has been achieved in view of the above circumstances, and has an object to reduce the size of an internal combustion engine including an auxiliary by reasonably disposing the auxiliary in the internal combustion engine.

In order to achieve the above object, according to a first feature of the present invention, there is provided an auxiliary arrangement structure in an internal combustion engine comprising a cylinder head having an plurality of intake ports, an intake manifold having a plurality of branch pipes connected to the intake ports in the cylinder head, and a throttle body disposed at one end in a direction of arrangement of the plurality of branch pipes, wherein an auxiliary of the internal combustion engine is disposed in a space surrounded by the cylinder head, the intake manifold and the throttle body.

With this arrangement, the auxiliary of the internal combustion engine is disposed in the space surrounded by the cylinder head having the plurality of intake ports, the intake manifold having the plurality of branch pipes connected to the intake ports in the cylinder head, and the throttle body disposed at one end in the direction of arrangement of the branch pipes of the intake manifold. Therefore, the auxiliary can be disposed by effectively utilizing an unused space surrounded by the cylinder head, the intake manifold and the throttle body, thereby reducing the entire length and the entire height of the internal combustion engine including the auxiliary.

According to a second feature of the present invention, in addition to the first feature, the internal combustion engine further comprises a control shaft of a variable valve-operating mechanism disposed in a lengthwise direction of the cylinder; and the auxiliary is an actuator for driving the control shaft.

With this arrangement, the auxiliary is the actuator for actuating the control shaft of the variable valve-operating mechanism of the internal combustion engine. Therefore, the actuator can be disposed at a position near an end of the control shaft, thereby facilitating the driving of the control shaft by the actuator while avoiding the interference with the variable valve-operating mechanism.

According to a third feature of the present invention, in addition to the second feature, the actuator is mounted at one end of the cylinder head, and connected through a power transmission mechanism to the control shaft in the vicinity of an end thereof.

With this arrangement, the actuator is mounted at one end of the cylinder head and connected through the power transmission mechanism to the control shaft at a portion near the end thereof. Therefore, it is possible to easily secure a space for arrangement of the power transmission device on the control shaft.

According to a fourth feature of the present invention, in addition to the first feature, an intake pipe length changing mechanism is accommodated in the intake manifold, and an actuator for driving the intake pipe length changing mechanism is mounted on the intake manifold so as to protrude from a side face of the manifold on a side where the throttle body is disposed; the auxiliary protrudes from a side face of the cylinder head on an intake side; and the throttle body is disposed in a space formed between the actuator and the auxiliary.

With this arrangement, the actuator for driving the intake pipe length changing mechanism in the intake manifold is mounted so as to protrude from the side face of the manifold on the side where the throttle body is disposed; the auxiliary protrudes from the side face of the cylinder head on the intake side; and the throttle body is disposed in the space formed between the actuator and the auxiliary. Therefore, not only the throttle body and the auxiliary but also the actuator can be disposed in an unused space surrounded by the cylinder head and the intake manifold.

According to a fifth feature of the present invention, in addition to the fourth feature, the structure further including a stay which couples a lower block to one end of the intake manifold at which the throttle body and the actuator are disposed.

With this arrangement, the stay couples the lower block to one end of the intake manifold at which the throttle body and the actuator are disposed. Therefore, the lower block can bear the weights of the intake manifold, the throttle body and the actuator through the stay.

According to a sixth feature of the present invention, in addition to the first feature, a starter motor is disposed along a lower surface of the intake manifold.

With this arrangement, the starter motor is disposed along the lower surface of the intake manifold. Therefore, the intake chamber blocks noise generated by the starter motor to exert a noise-insulating effect.

An actuator 50 in an embodiment corresponds to the auxiliary of the present invention.

The above-mentioned object, other objects, characteristics, and advantages of the present invention will become apparent from the preferred embodiment, which will be described in detail below by reference to the attached drawings.

DETAILED DESCRIPTION OF THE PREFERRED EMBODIMENT

This embodiment relates to a structure of arrangement of an actuator for rotatingly driving a control shaft of a variable valve-operating mechanism of an internal combustion engine. First, the structure of the variable valve-operating mechanism is described.

Figure 1:
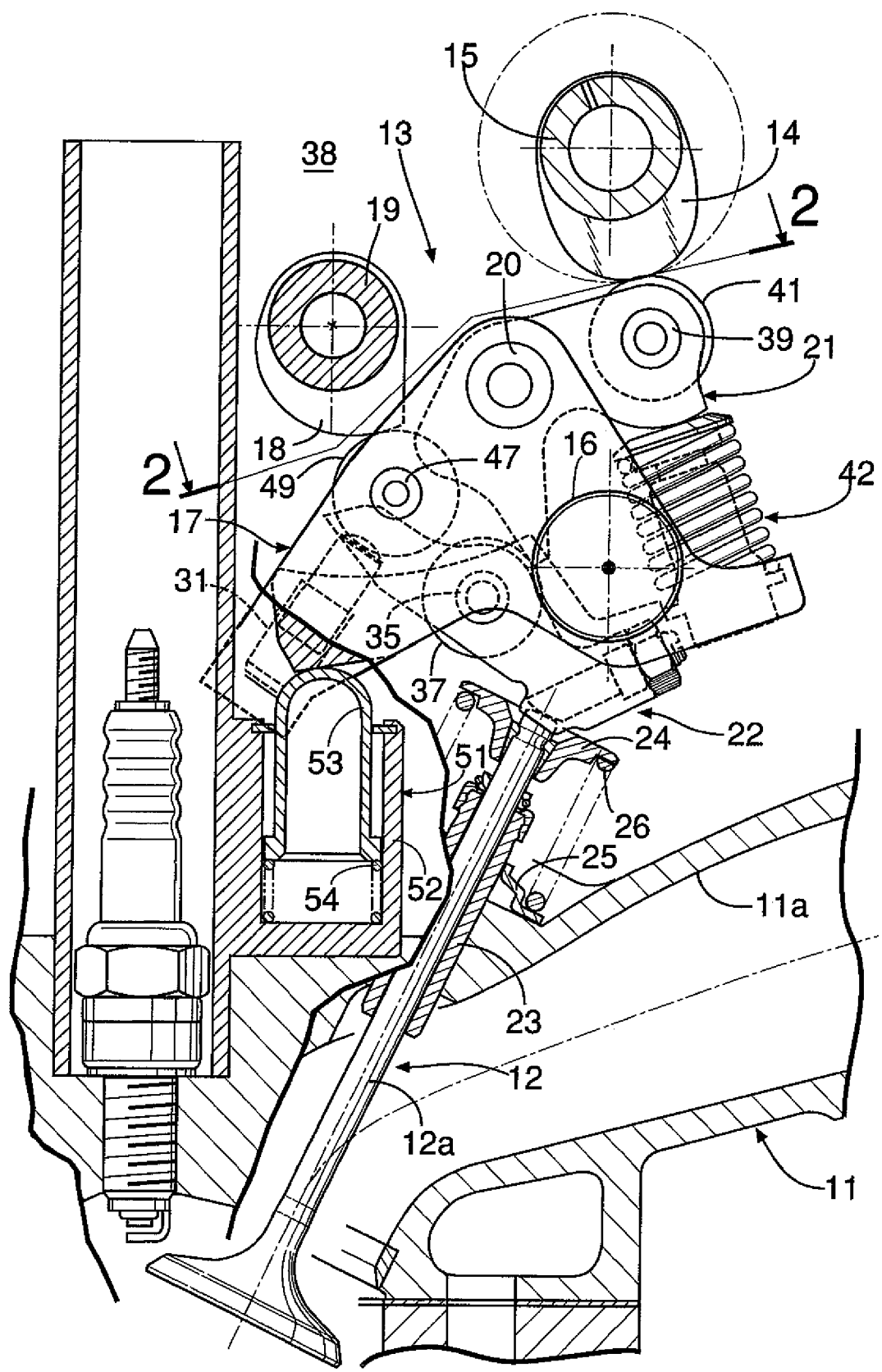
FIG. 1 is a vertical sectional side view of essential portions of an internal combustion engine having a structure of arrangement of an actuator according to an embodiment of the present invention.
Figure 2:
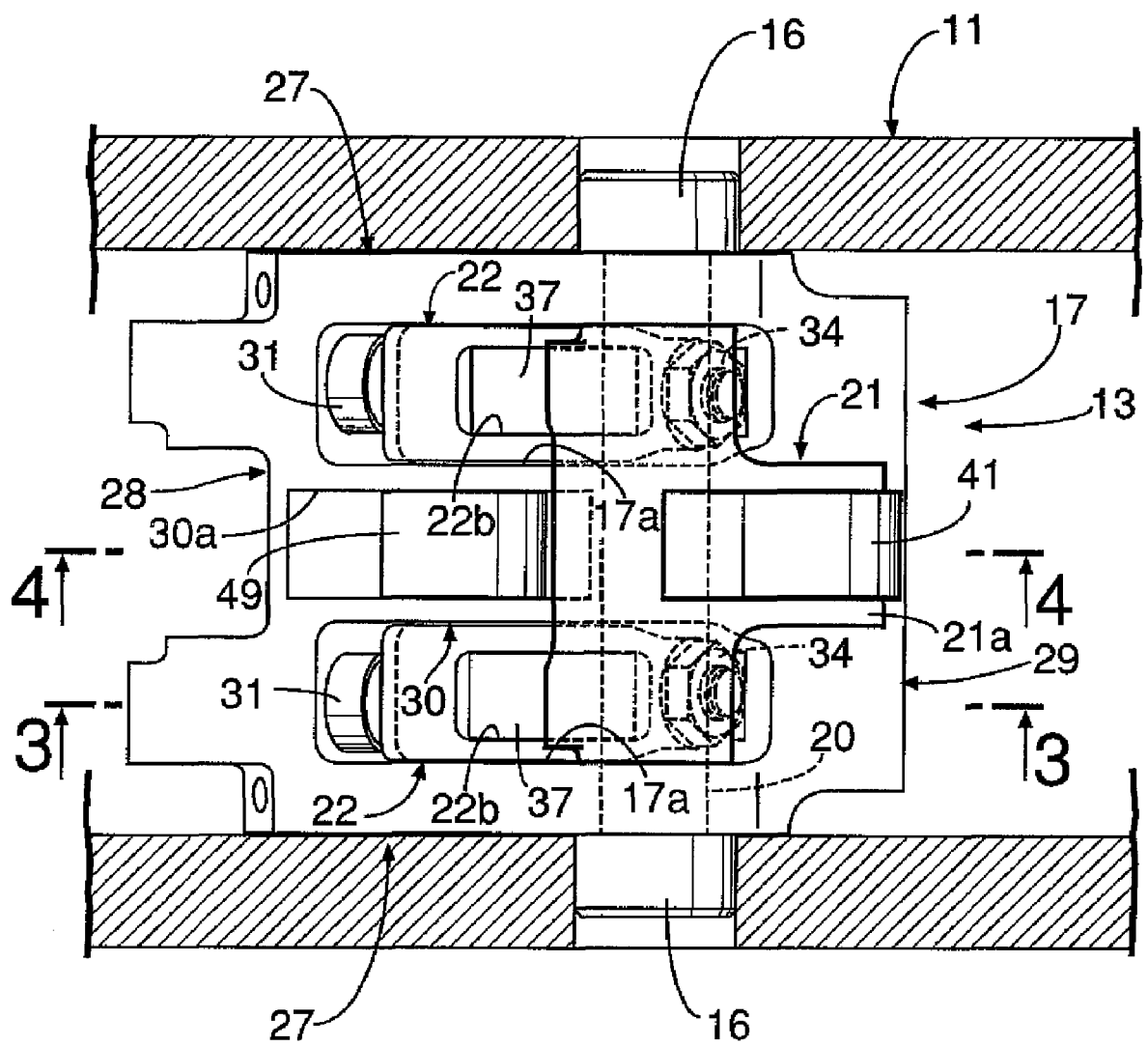
FIG. 2 is a view taken along a line 2-2 in FIG. 1.

As shown in FIGS. 1 and 2, an internal combustion engine comprises a cylinder head 11 in which a pair of intake valves 12, 12 are disposed for opening and closing intake ports 11a, 11a of each cylinder. A variable valve-operating mechanism 13 is provided in a valve- operating chamber 38 to open and close the intake valves 12, 12. The variable valve-operating mechanism 13 includes: a camshaft 15 including a valve-operating cam 14; a control arm 17 swingably supported in the cylinder head 11 through support shafts 16, 16; a control shaft 19 including a control cam 18 for swinging the control arm 17; a subsidiary cam 21 swingably supported on the control arm 17 through a movable support shaft 20, and swinging so as to follow the valve-operating cam 14; and a pair of rocker arms 22, 22 individually connected to and operable in association with the intake valves 12, 12, and following the movement of the subsidiary cam 21. Operational characteristics including a valve lift amount of the intake valves 12, 12 can be changed by displacing the movable support shaft 20.

The intake valves 12, 12 have stems 12a, 12a slidably fitted in guide tubes 23, 23 disposed in the cylinder head 11. Valve springs 26, 26 are interposed between retainer 24, 24 mounted at upper ends of the stems 12a, 12a and retainers 25, 25 abutting against the cylinder head 11. The valve springs 26, 26 urge the intake valves 12, 12 in closing directions.

The control arm 17 comprises a single member, and includes a pair of plate-shaped sidewalls 27, 27 in which the pair of support shafts 16, 16 are provided. The sidewalls 27, 27 are arranged in parallel with a predetermined space therebetween. One ends of the sidewalls 27, 27 are connected to each other by an end wall 28 extending in parallel to the support shafts 16, 16. The other ends of the sidewalls 27, 27 are connected to each other by a connecting wall 29 extending in parallel to the support shafts 16, 16. The end wall 28 and the connecting wall 29 are integrally connected to each other by a partition wall 30.

As clearly shown in FIGS. 1 to 4, the pair of sidewalls 27, 27 and the partition wall 30 extend in parallel to each other, and two rocker arm accommodating bores 17a, 17a are formed between the sidewalls 27, 27 and the partition wall 30.

Rocker arms 22, 22 of a type having no rocker shaft are accommodated in the rocker arm accommodating bores 17a. A recess 22a formed at one end of each rocker arm 22 is swingably supported on a spherical bearing surface 31a formed at a tip end of a hydraulic tappet 31 which is mounted in a hydraulic tappet- mounting bore 28a in the end wall 28, and the rocker arm 22 urges the intake valve 12 at the other end thereof. More specifically, an abutment member 32 is slidably supported at the other end of the rocker arm 22 to abut against an upper end of the stem 12a of the intake valve 12, and the seated state of the intake valve 12 can be adjusted by adjusting the position of the abutment member 32 through an adjusting screw 33 and a locking nut 34. A roller 37 is rotatably supported, through a needle bearing 36, on a roller shaft 35 extending through a roller- accommodating bore 22b formed in an intermediate portion of the rocker arm 22.

The subsidiary cam 21 is swingably supported on the movable support shaft 20 extending between the pair of sidewalls 27, 27 of the control arm 17. A roller 41 is supported, through a roller shaft 39 and a needle bearing 40, on a first arm 21a protruding from an axially central portion of the subsidiary cam 21, and abuts against the valve-operating cam 14 provided on the camshaft 15. Cam faces 21c, 21c are formed on a pair of second arms 21b, 21b protruding from axially opposite ends of the subsidiary cam 21. The rollers 37, 37 of the rocker arms 22, 22 abut against the cam faces 21c, 21c.

An urging means 42 is mounted in an urging means mounting bore 29a formed in the connecting wall 29 of the control arm 17 so that the urging means 42 generates an urging force for bringing the roller 41 of the subsidiary cam 21 into abutment against the valve-operating cam 14. The urging means 42 comprises: a guide tube 43 press-fitted into the urging means mounting bore 29a in the connecting wall 29; a pressing member 44 slidably received in the guide tube 43; an abutting portion 45 provided at an upper end of the pressing member 44 to abut against a lower surface of the first arm 21a of the subsidiary cam 21; and a coil spring 46 mounted under compression between the guide tube 43 and the abutting portion 45 to urge the pressing member 44 in a protruding direction.

Figure 3:
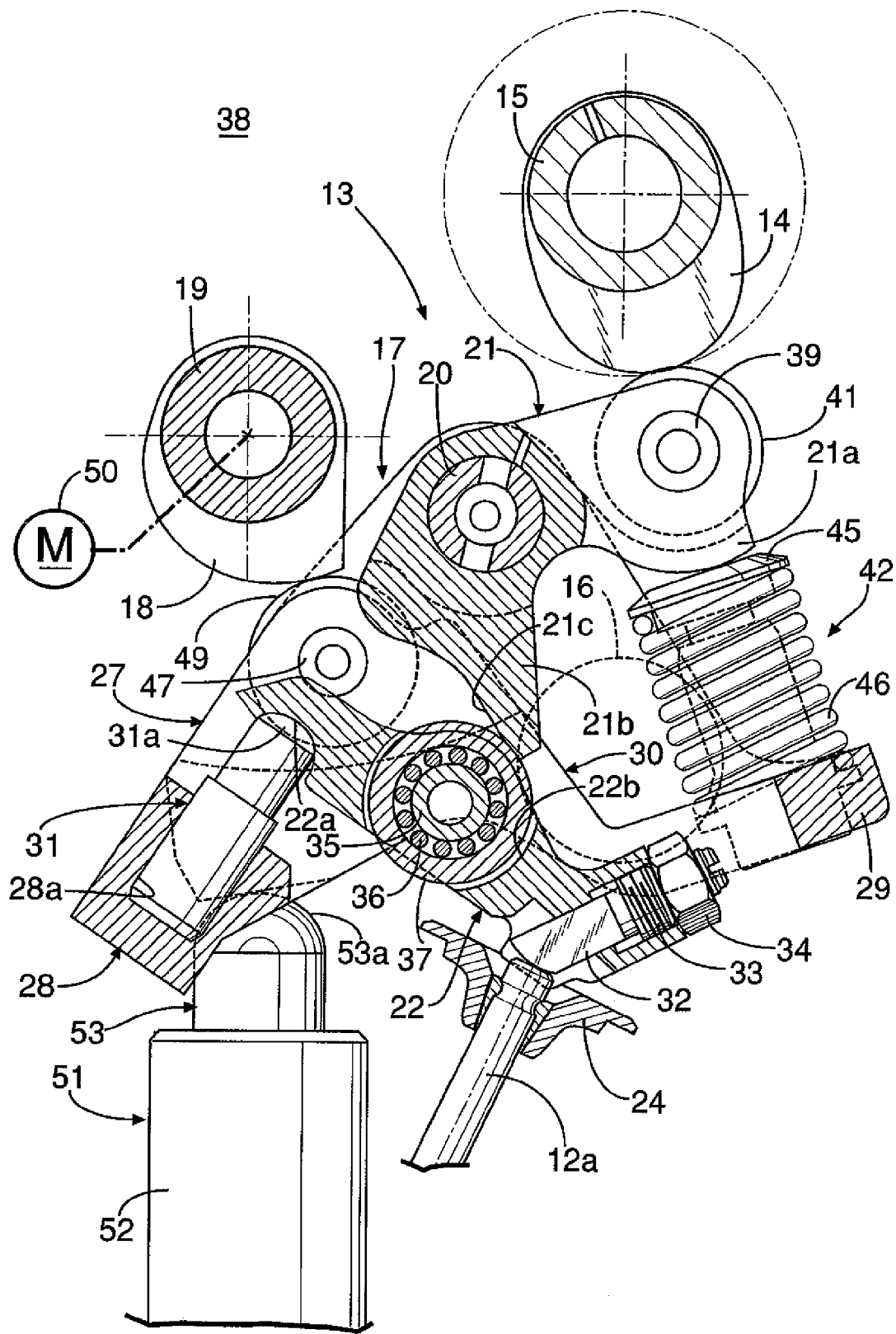
FIG. 3 is a sectional view taken along a line 3-3 in FIG. 2 in a high valve lift state.
Figure 4:
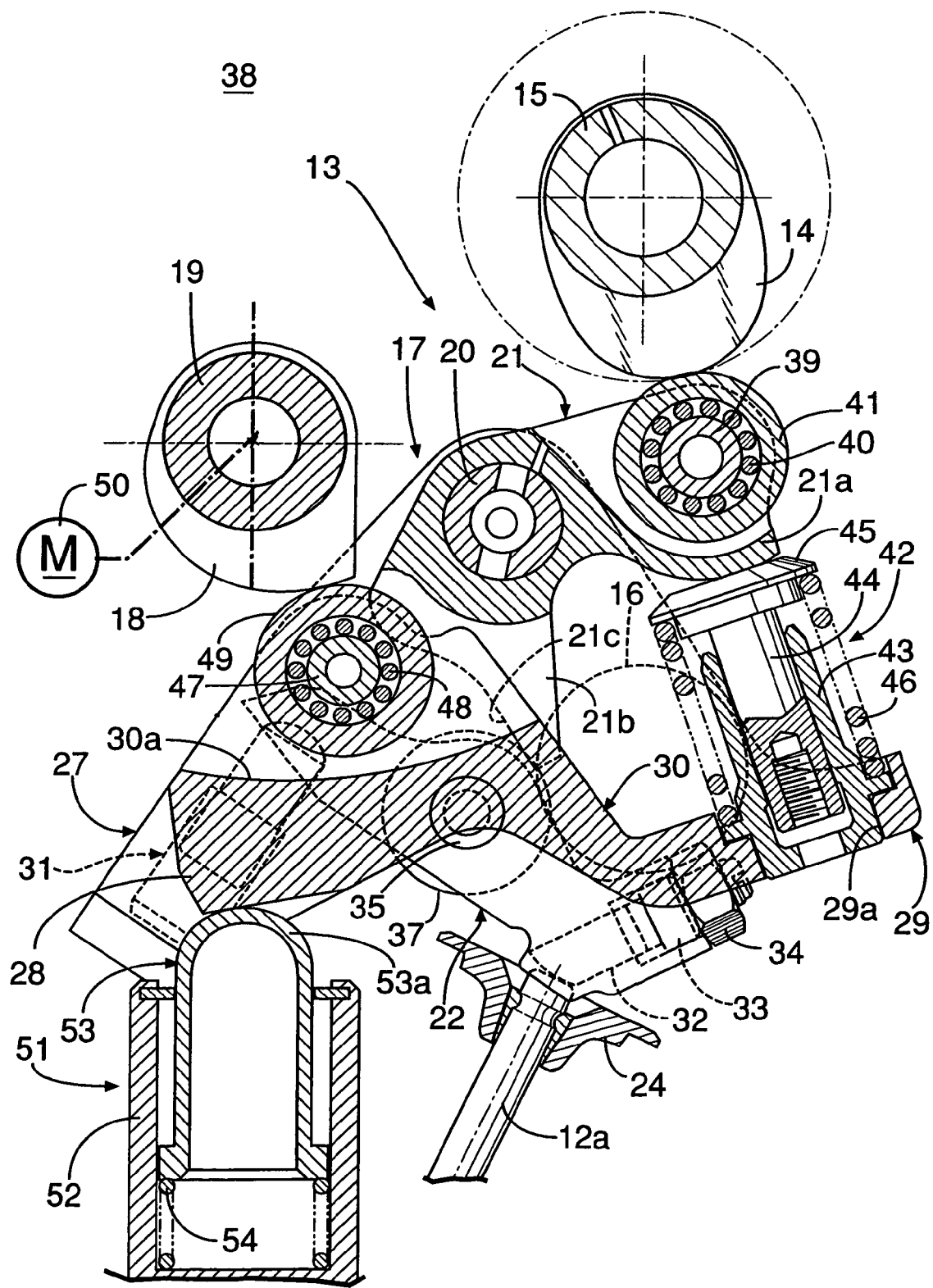
FIG. 4 is a sectional view taken along a line 4-4 in FIG. 2 in the high valve lift state.
Figure 5:
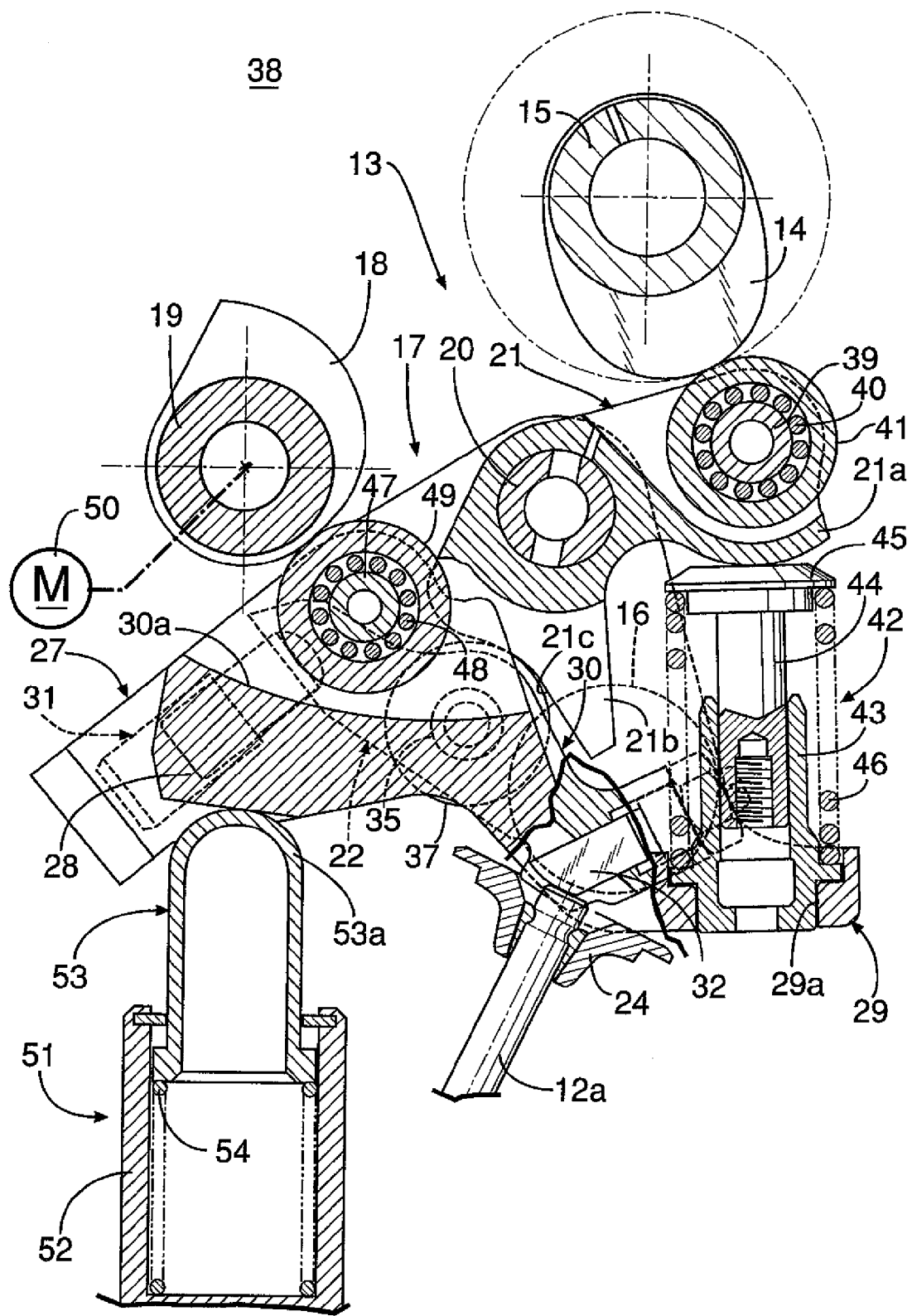
FIG. 5 is a sectional view similar to FIG. 4 but in a low valve lift state.
Figure 6:
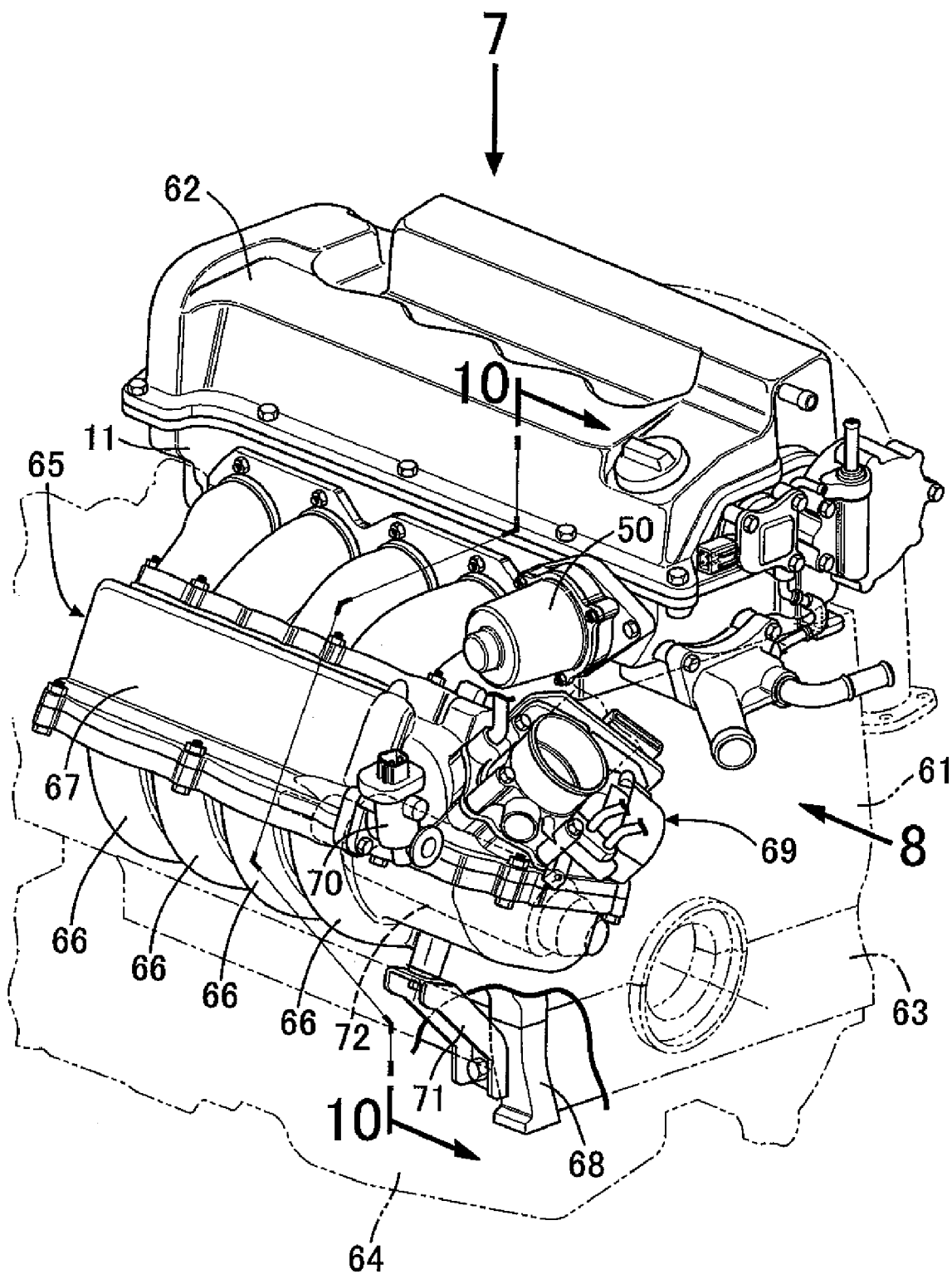
FIG. 6 is a perspective view of the internal combustion engine.
Figure 7:
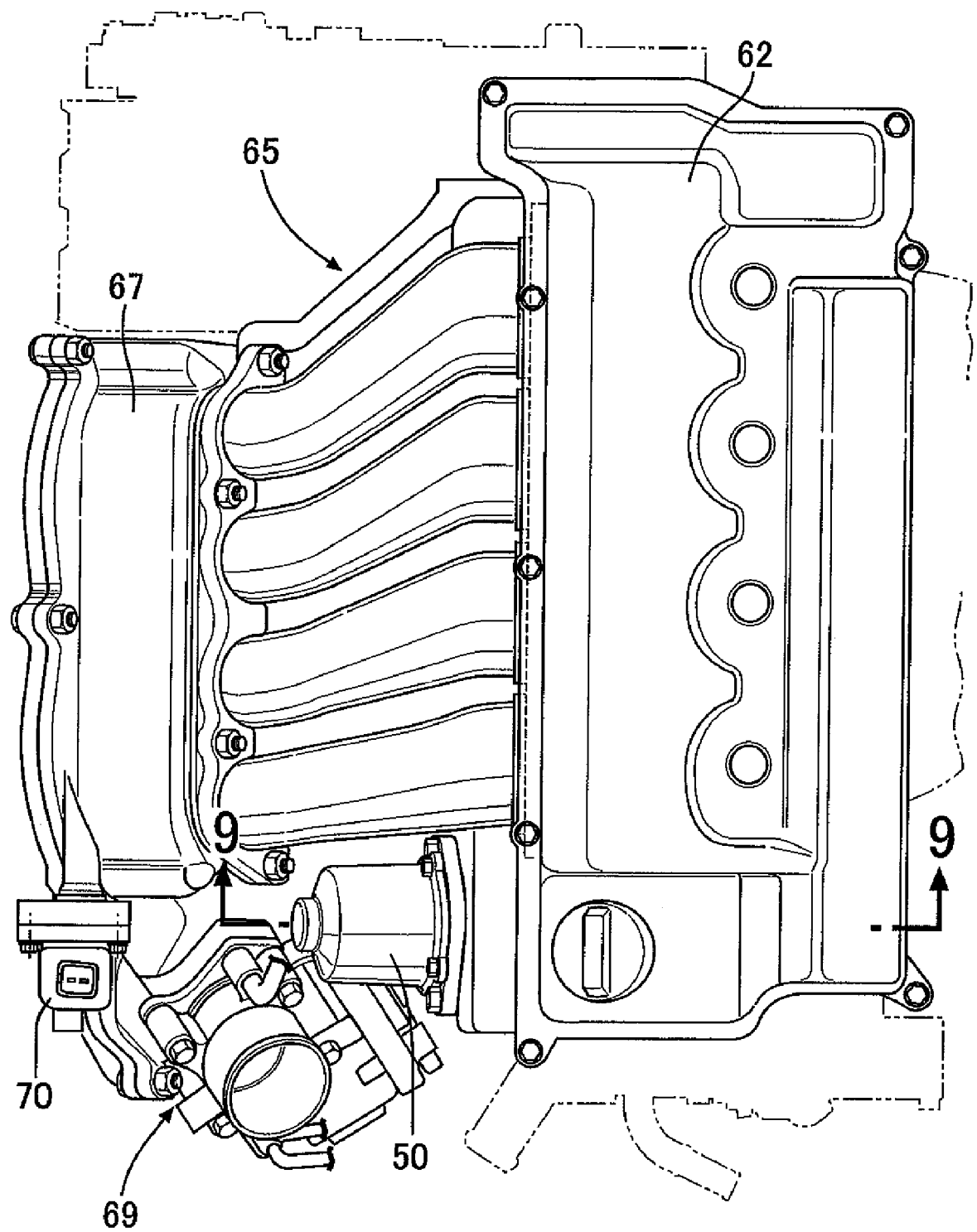
FIG. 7 is a view taken in a direction of an arrow 7 in FIG. 6.
Figure 8:
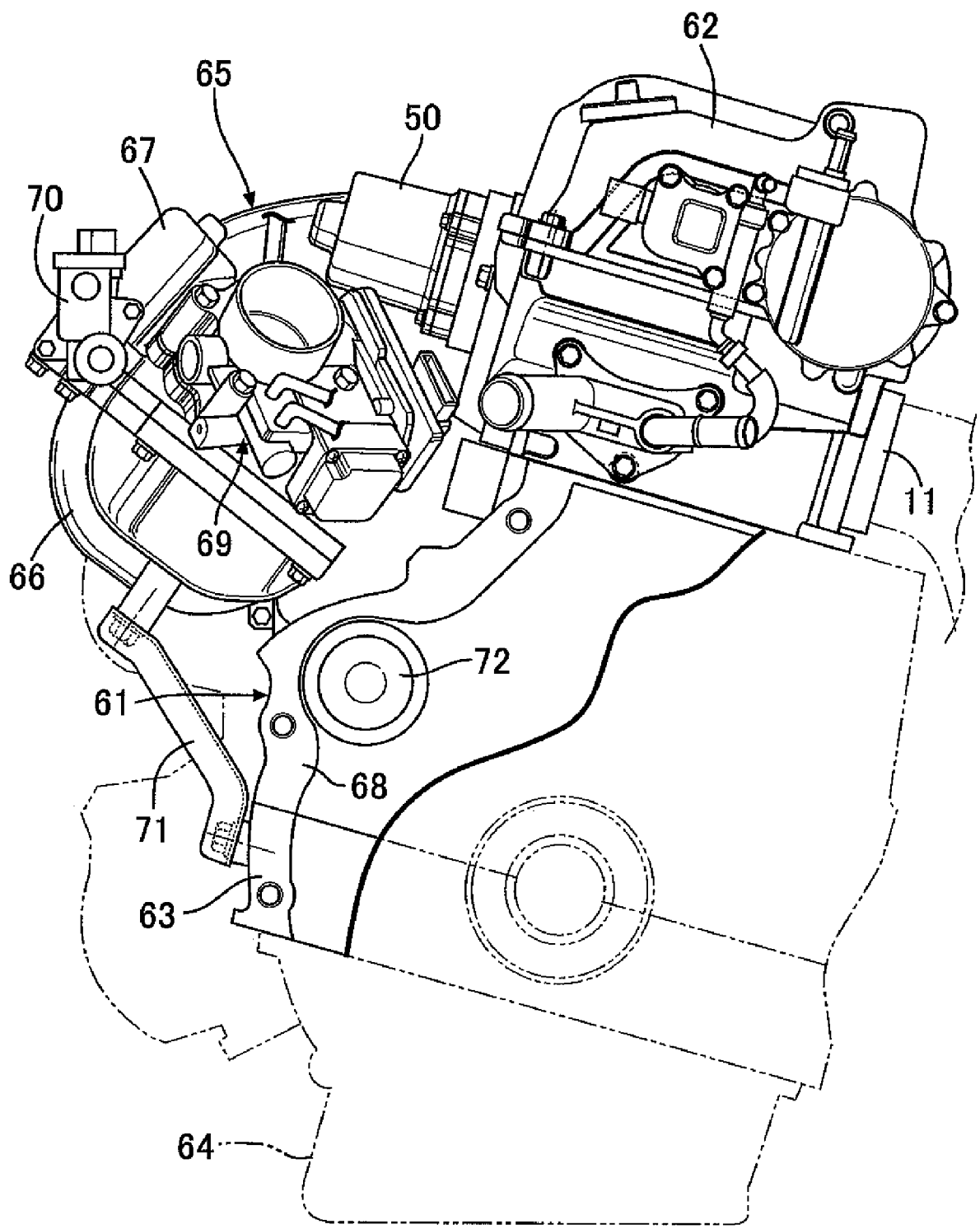
FIG. 8 is a view taken in a direction of an arrow 8 in FIG. 6.
Figure 9:
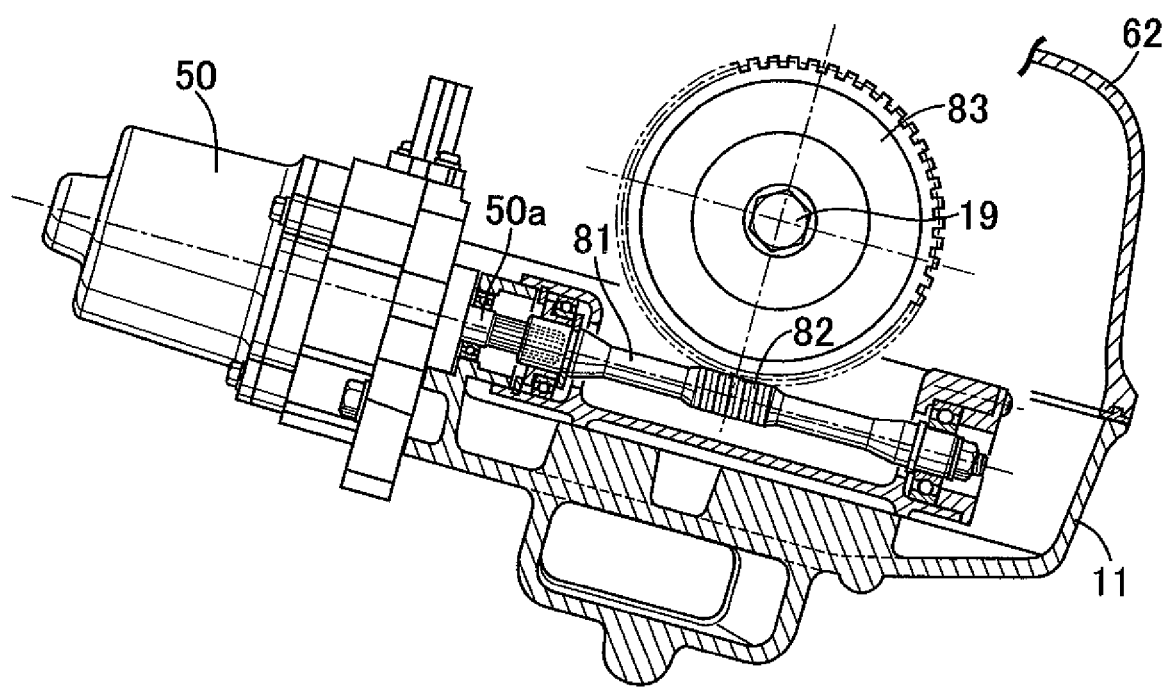
FIG. 9 is a sectional view taken along a line 9-9 in FIG. 7.

A roller 49 is rotatably supported, through a needle bearing 48, on a roller shaft 47 extending through the roller accommodating recess 30a formed at a central portion of the partition wall 30 of the control arm 17. In order to urge the roller 49 to swing the control arm 17 about the support shafts 16, 16, the control cam 18 having a cam face comprising an involute curve is provided on the control shaft 19 which is reciprocally turned by an actuator 50 comprising an electric motor. Referring to FIGS. 3 to 5, when the control shaft 19 is turned in the clockwise direction, the control arm 17 is swung in the counterclockwise direction about the support shafts 16, 16; and when the control shaft 19 is turned in the counterclockwise direction, the control arm 17 is swung in the clockwise direction about the support shafts 16, 16.

An urging means 51 is mounted in the cylinder head 11 so as to urge the control arm 17 in the clockwise direction to bring the roller 49 into abutment against the control cam 18. The urging means 51 comprises: a guide tube 52 press-fitted in the cylinder head 11; a pressing member 53 slidably fitted in the guide tube 52; and a coil spring 54 exerting a resilient force to urge the pressing member 53 in a direction to protrude from the guide tube 52. A spherical portion 53a at an upper end of the pressing member 53 abuts against a lower surface of a central portion of the end wall 28 of the control arm 17.

Thus, when the control arm 17 is disposed at a position shown in FIGS. 3 and 4 by the control cam 18, namely, when the highest lift portion of the control cam 18 is brought into abutment against the roller 49, leading end sides (sides away from the movable support shaft 20) of the cam faces 21c, 21c of the subsidiary cam 21 swinging about an axis of the movable support shaft 20 are brought into abutment against the rollers 37, 37 of the rocker arms 22, 22. Therefore, the swing angles of the rocker arm 22, 22 are increased, whereby the valve lift amounts of the intake valves 12, 12 becomes largest.

When the control arm 17 is positioned at a position shown in FIG. 5 by the control cam 18, namely, when the lowest lift portion of the control cam 18 is brought into abutment against the roller 49, base end side (sides close to the movable support shaft 20) of the cam faces 21c, 21c of the subsidiary cam 21 swinging about the axis of the movable support shaft 20 are brought into abutment against the rollers 37, 37 of the rocker arms 22, 22. Therefore, the swing angles of the rocker arm 22, 22 are decreased, whereby the valve lift amounts of the intake valves 12, 12 becomes smallest (zero).

In this way, the valve lift amounts of the intake valves 12, 12 are changed by swinging the control arm 17 about the support shafts 16, 16, and also a timing for the valve-operating cams 14, 14 to contact the rollers 41, 41 are changed by the swing of the control arm 17 to change timings of opening and closing the intake valves 12, 12.

Next, referring to FIGS. 6 to 9, the arrangement of the actuator 50 which reciprocally rotatingly drives the control shaft 19 of the variable valve-operating mechanism 13 will be described below.

The internal combustion engine comprises: the cylinder head 11 fastened to an upper surface of a cylinder block 61; a head cover 62 fastened to an upper surface of the cylinder head 11; a lower block 63 fastened to a lower surface of the cylinder block 61; and an oil pan 64 fastened to a lower surface of the lower block 63. An intake manifold 65 is attached to a side face of the cylinder head 11 on the intake side.

The internal combustion engine in this embodiment has four cylinders. The intake manifold 65 comprises: four branch pipes 66 connected at their downstream ends to the intake ports 11a (see FIG. 1) of each cylinder; and an intake chamber 67 connected to upstream sides of the branch pipes 66. A throttle body 69 is coupled to the intake chamber 67 on a lengthwise one end side of the intake chamber 67, namely, on a side of a transmission coupling surface 68 formed on the cylinder block 61, the cylinder head 11 and the lower block 63.

The actuator 50 for driving the control shaft 19 of the variable valve-operating mechanism 13 is mounted on a side face of the cylinder head 11 on the intake side at a lengthwise one end. The actuator 50 comprises an electric motor having an output shaft 50a disposed in a direction perpendicular to the control shaft 19. A worm 82 is provided on a power transmission shaft 81 which is directly connected to the output shaft 50a. A worm wheel 83 is provided at an end of the control shaft 19 inside the cylinder head 11. The worm 82 is meshed with the worm wheel 83. The worm 82 and the worm wheel 83 constitute the power transmission mechanism of the present invention, but the transmission mechanism may be any other means such as a bevel gear. The actuator 50 for the variable valve-operating mechanism 13 is disposed in a space surrounded by the cylinder head 11, the intake manifold 65 and the throttle body 69.

The branch pipes 66 of the intake manifold 65 extend from the side face on the intake side of the cylinder head 11 such that they are slightly curved downwards. Thus, the intake chamber 67 of the intake manifold 65 is positioned sideways of mating faces between the cylinder block 61 and the cylinder head 11. In order to enhance the air intake efficiency in various operational states of the internal combustion engine, a known intake pipe length changing mechanism is accommodated in the intake chamber 67, and an actuator 70 for driving the intake pipe length changing mechanism is mounted to the intake chamber 67 adjacent to the throttle body 69, at lengthwise one end of the intake chamber 67.

Figure 10:
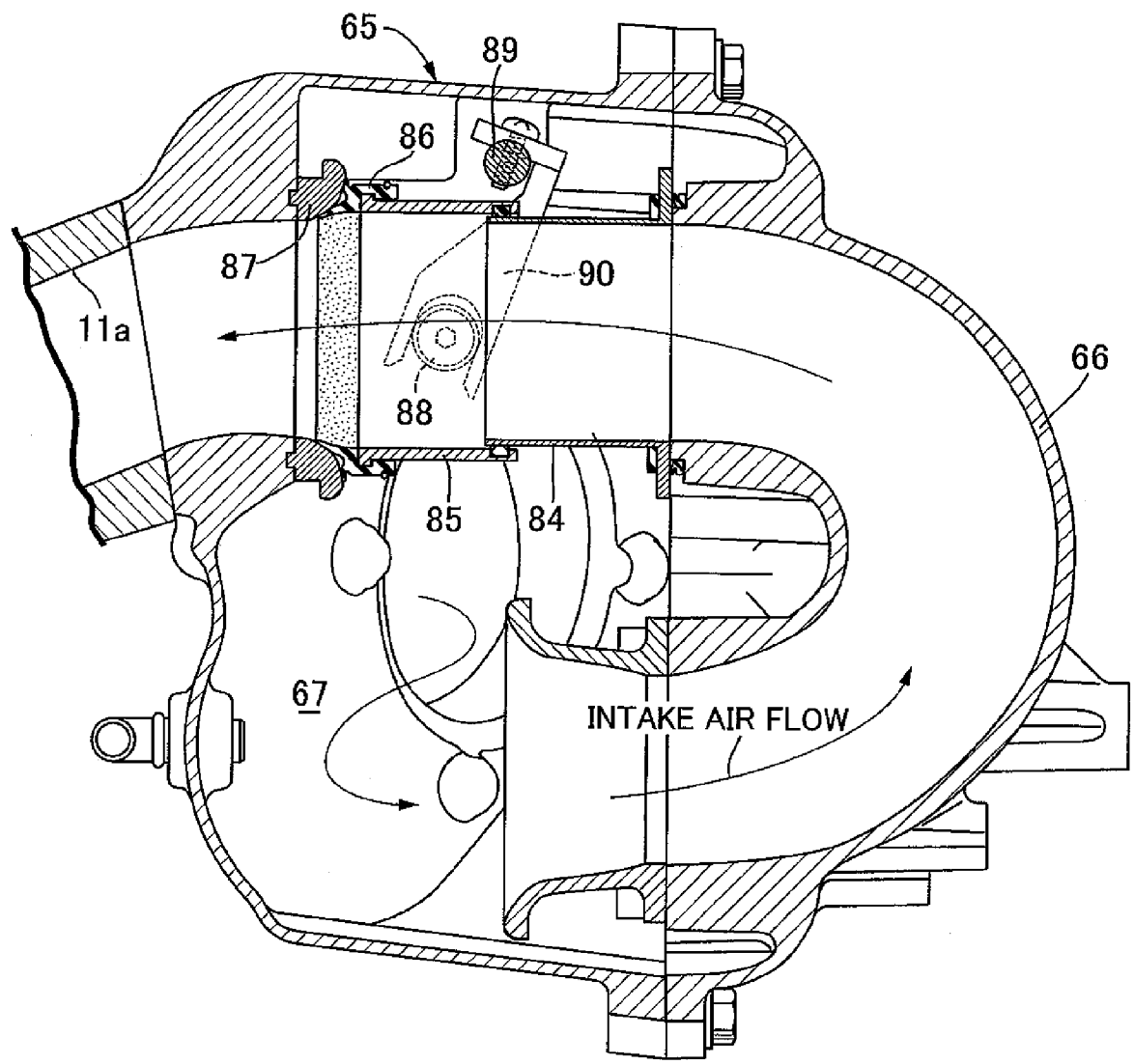
FIG. 10 is a sectional view taken along a line 10-10 in FIG. 6.
Figure 11:
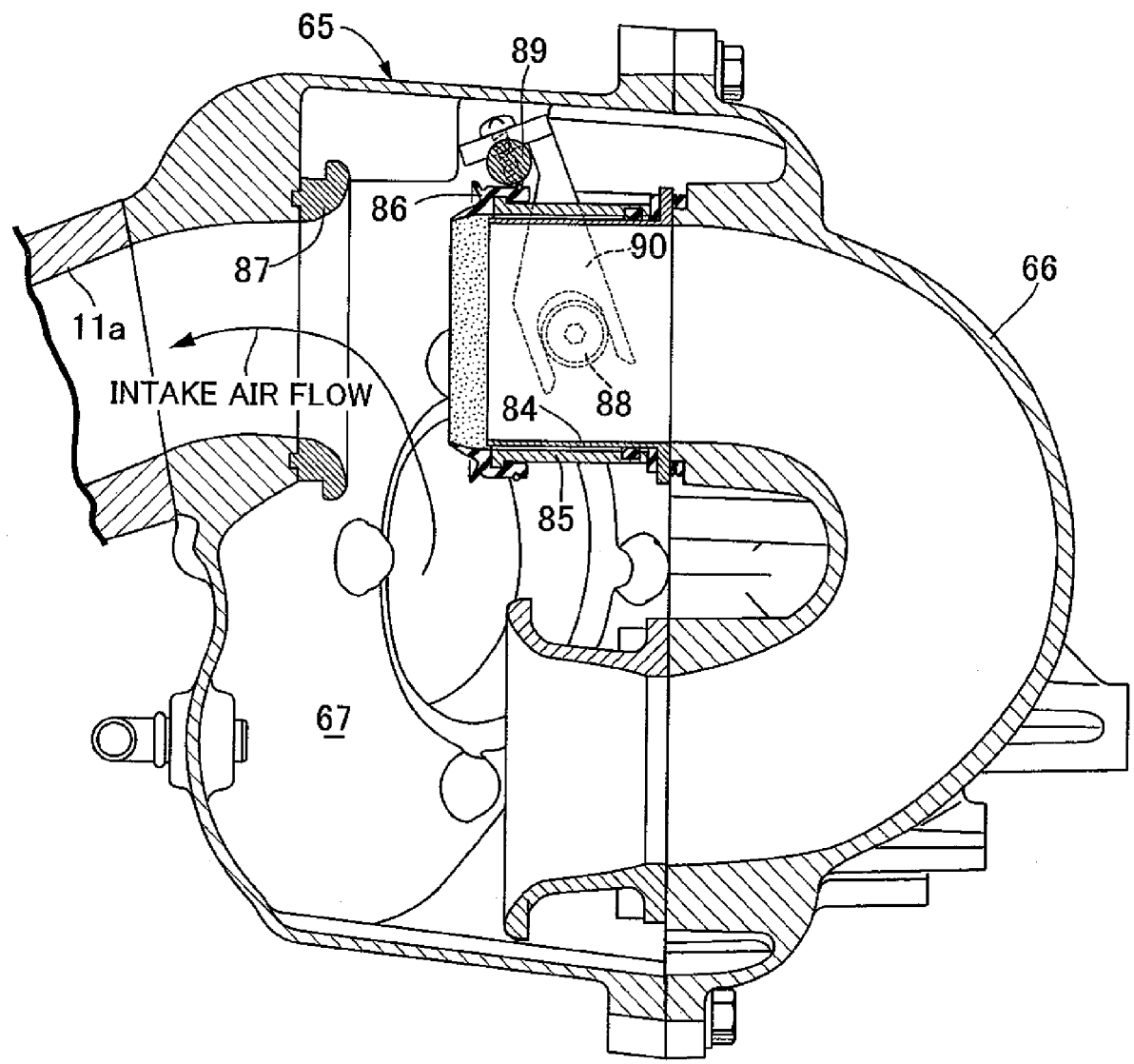
FIG. 11 is a view, corresponding to FIG. 10, for explaining operation of an intake pipe length changing mechanism.

FIGS. 10 and 11 show the structure of the intake pipe length changing mechanism. Each of the upstream ends (lower ends) of the branch pipes 66 is curved into a U-shape, is expanded into a funnel-shape, and is open into the intake chamber 67. On the other hand, each of the downstream ends (upper ends) of the branch pipes 66 comprises a guide tube 84 projecting into the intake chamber 67. A sleeve-shaped valve body 85 is slidably fitted to an outer periphery of the guide tube 84. A resilient seal member 86 is provided at a tip end of the valve body 85. The resilient seal member 86 faces a valve seat 87, which is connected to the upstream end of the intake port 11a, so that the resilient seal member 86 can be seated on the valve seat 87. The four valve bodies 85 are integrally connected to each other. A roller 88 is provided on one ends of the valve bodies 85. A drive shaft 89 of the actuator 70 (see FIG. 6) of the intake pipe length changing mechanism projects into the intake chamber 67. An operating lever 90 provided on a tip end of the drive shaft 89 has a bifurcated portion which is engaged with the roller 88.

Therefore, as shown in FIG. 10, when the drive shaft 89 of the actuator 70 is driven in the clockwise direction, the valve body 85 is moved leftward in FIG. 10 by the operating lever 90, the resilient seal member 86 provided at the tip end of the valve body 85 is seated on the valve seat 87, and thus the intake air flows through inside the U-shaped branch pipe 66, thereby increasing the intake pipe length. Conversely, as shown in FIG. 11, when the drive shaft 89 of the actuator 70 is driven in the counterclockwise direction, the valve body 85 is moved rightward in FIG. 11 by the operating lever 90, the resilient seal member 86 provided at the tip end of the valve body 85 is moved away from the valve seat 87, and thus the intake air flows from the intake chamber 67 directly into the intake port 11a without passing through the branch pipe 66, thereby decreasing the intake pipe length.

A sidewall of the lower block 63 near the transmission coupling surface 68 is coupled to a lower end of the stay 71. A lower surface of the intake chamber 67 of the intake manifold 65 at its lengthwise one end is coupled to an upper end of the stay 71. A starter motor 72 is supported in the vicinity of an outer periphery of the transmission coupling surface 68. The starter motor 72 is arranged in parallel to an axis of a crankshaft, and disposed along a lower surface of the intake chamber 67 of the intake manifold 65.

The operation of the embodiment of the present invention having the above-described arrangement will be described below.

Because the actuator 50 for driving the control shaft 19 of the variable valve-operating mechanism 13 is disposed in the space surrounded by the cylinder head 11, the intake manifold 65 and the throttle body 69, it is possible to effectively utilize the space for the arrangement of the actuator 50 to decrease the size of the internal combustion engine. In other words, the entire length, the entire height and the entire width of the internal combustion engine including the actuator 50 cannot be increased due to the provision of the actuator 50.

Further, because the actuator 50 is mounted on one end of the cylinder head 11, and a portion (near the end) of the control shaft 19 disposed along the lengthwise direction of the cylinder head 11 is connected to the actuator 50 through the power transmission mechanism, it is possible to easily secure a space for disposing the power transmission mechanism on the control shaft 19. This is because it is difficult to secure a space for disposing the power transmission mechanism, because the plurality of control cams 18 are provided at predetermined distances on the intermediate portion of the control shaft 19 corresponding to the plurality of intake valves 12.

The throttle body 69 is disposed in a space formed between the actuator 50 protruding from the side face of the cylinder head 11 on the intake side and the actuator 70 protruding from the side face of the intake chamber 67 on the side where the throttle body 69 is disposed.

Because the variable valve-operating mechanism 13 is built in the cylinder head 11, the length of the cylinder head 11 in a direction of arrangement of the cylinders is larger than the length in a direction of arrangement of the branch pipes 66 of the intake manifold 65, thereby forming an unused space surrounded by the cylinder head 11 and the intake manifold. Thus, not only the throttle body 69 and the actuator 50 but also the actuator 70 can be disposed in such an unused space.

The lower block 63 in the vicinity of the transmission coupling surface 68, to which the lower end of the stay 71 is coupled, is a portion having a high rigidity, and the throttle body 69 and the actuator 70 for the intake pipe length changing mechanism are mounted in the vicinity of a portion where the upper end of the stay 71 is coupled to the intake manifold 65. Therefore, the weights of the intake manifold 65, the throttle body 69 and actuator 70 for the intake pipe length changing mechanism can be affectively supported by the stay 71.

Further, because the starter motor 72 is disposed along the lower surface of the intake chamber 67 of the intake manifold 65, the starter motor 72 blocks noise generated by the intake chamber 67 to exert a noise-insulating effect.

The embodiments of the present invention have been described above, but various changes in design may be made without departing from the subject matter of the present invention.

For example, the actuator 50 for driving the control shaft 19 of the variable valve-operating mechanism 13 has been described as an auxiliary in the embodiment, but the auxiliary of the present invention is not limited to the actuator 50. The auxiliary of the present invention may be an actuator for the variable valve-operating mechanism which changes a valve timing by changing the rotational phase of the camshaft 15, or an actuator 70 for the intake pipe length changing mechanism, or a pump driven by the camshaft 15.

What is claimed is:

1. An auxiliary arrangement structure in an internal combustion engine, comprising:
   a cylinder head having an plurality of intake ports,
   an intake manifold having a plurality of branch pipes connected to the intake ports in the cylinder head, and
   a throttle body disposed at one end in a direction of arrangement of the plurality of branch pipes,
   wherein an auxiliary of the internal combustion engine is disposed in a space surrounded by the cylinder head, the intake manifold and the throttle body,
   wherein an intake pipe length changing mechanism is accommodated in the intake manifold, and an actuator for driving the intake pipe length changing mechanism is mounted on the intake manifold so as to protrude from a side face of the manifold on a side where the throttle body is disposed;
   wherein the auxiliary protrudes from a side face of the cylinder head on an intake side thereof; and
   wherein the throttle body is disposed in a space formed between the actuator and the auxiliary.

2. An auxiliary arrangement structure in an internal combustion engine according to claim 1,
   wherein the internal combustion engine further comprises a control shaft of a variable valve-operating mechanism disposed in a lengthwise direction of the cylinder head; and
   wherein the auxiliary is an actuator for driving the control shaft.

3. An auxiliary arrangement structure in an internal combustion engine according to claim 2, wherein the actuator is mounted at one end of the cylinder head, and is connected through a power transmission mechanism to the control shaft in the vicinity of an end thereof.

4. An auxiliary arrangement structure in an internal combustion engine according to claim 1, further comprising a stay which couples a lower block to one end of the intake manifold at which the throttle body and the actuator are disposed.

5. An auxiliary arrangement structure in an internal combustion engine according to claim 1, wherein a starter motor is disposed along a lower surface of the intake manifold.

* * * * *